US006200650B1

(12) United States Patent
Emch

(10) Patent No.: US 6,200,650 B1
(45) **Date of Patent: *Mar. 13, 2001**

(54) PROCESSES FOR DRYING AND CURING PRIMER COATING COMPOSITIONS

(75) Inventor: Donaldson J. Emch, Brighton, MI (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/320,484

(22) Filed: May 26, 1999

(51) Int. Cl.[7] .......................... B29C 71/02; B29C 71/04; B29C 41/22; B05D 3/02; B05D 3/06

(52) U.S. Cl. ...................... 427/542; 427/388.1; 427/379; 427/493; 427/410; 427/189; 427/195

(58) Field of Search .................................... 427/542, 384, 427/388.1, 386, 379, 410, 493, 189, 195

(56) References Cited

U.S. PATENT DOCUMENTS

| | | | | |
|---|---|---|---|---|
| 2,377,946 | | 6/1945 | Leary | 18/19 |
| 2,472,293 | | 6/1949 | Groven | 34/60 |
| 2,478,001 | | 8/1949 | Miskella | 219/35 |
| 2,498,339 | | 2/1950 | Miskella | 91/55 |
| 3,591,767 | | 7/1971 | Mudie | 219/354 |
| 3,731,051 | | 5/1973 | Ellersick | 219/162 |
| 4,259,566 | | 3/1981 | Kobayashi | 219/222 |
| 4,349,724 | | 9/1982 | Ellersick | 219/347 |
| 4,389,970 | | 6/1983 | Edgerton | 118/666 |
| 4,423,312 | | 12/1983 | Wiedenfeld et al. | 219/388 |
| 4,461,094 | | 7/1984 | Schnalke | 34/9 |
| 4,535,548 | | 8/1985 | Hyde | 34/4 |
| 4,908,231 | * | 3/1990 | Nelson et al. | 427/542 |
| 4,943,447 | * | 7/1990 | Nelson et al. | 427/542 |
| 4,988,537 | * | 1/1991 | Tanimoto et al. | 427/542 |
| 5,075,132 | | 12/1991 | Ogasawara | 427/55 |
| 5,323,485 | | 6/1994 | Josefsson et al. | 392/417 |
| 5,654,037 | | 8/1997 | Moore et al. | 427/379 |
| 5,888,592 | * | 3/1999 | Biallas et al. | 427/542 |

* cited by examiner

*Primary Examiner*—Marianne Padgett
(74) *Attorney, Agent, or Firm*—Ann M. Cannoni; Deborah M. Altman

(57) ABSTRACT

Processes for drying primer coating compositions applied to a surface of a substrate are provided in which the primer coating composition, if a liquid or powder slurry, is exposed to low velocity air having a temperature ranging from about 10° C. to about 50° C. for a period of at least about 30 seconds to volatilize at least a portion of volatile material from the liquid primer coating composition. Next, infrared radiation and low velocity warm air are applied simultaneously to the primer coating composition (liquid, powder slurry or powder) for a period of at least about 1 minute during which the temperature of the substrate is increased at a rate ranging from about 0.2° C. per second to about 2° C. per second to achieve a peak substrate temperature of the substrate ranging from about 30° C. to about 120° C. Infrared radiation and hot air are applied simultaneously to the primer composition for a period of at least about 2 minutes during which the temperature of the substrate is increased at a rate ranging from about 0.1° C. per second to about 10° C. per second to achieve a peak temperature of the substrate ranging from about 40° C. to about 155° C., such that a dried primer coating is formed upon the surface of the substrate.

24 Claims, 3 Drawing Sheets

PROCESSES FOR DRYING AND CURING PRIMER COATING COMPOSITIONS

CROSS-REFERENCE TO RELATED APPLICATIONS

This patent application is related to U.S. patent application Ser. No. 09/320,264 entitled "Multi-Stage Processes for Coating Substrates with Liquid Basecoat and Powder Topcoat"; U.S. patent application Ser. No. 09/320,265 entitled "Multi-Stage Processes for Coating Substrates with Liquid Basecoat and Liquid Topcoat"; U.S. patent application Ser. No. 09/320,483 entitled "Processes for Coating a Metal Substrate with an Electrodeposited Coating Composition and Drying the Same"; and U.S. patent application Ser. No. 09/320,522 entitled "Processes for Drying Topcoats and Multicomponent Composite Coatings On Metal and Polymeric Substrates", all of Donaldson J. Emch and each filed concurrently with the present application.

FIELD OF THE INVENTION

The present invention relates to drying of primer (primer/surfacer) coating compositions for automotive coating applications and, more particularly, to multi-stage processes for drying primer coating compositions which include a combination of infrared radiation and convection drying.

BACKGROUND OF THE INVENTION

Today's automobile bodies are treated with multiple layers of coatings which not only enhance the appearance of the automobile, but also provide protection from corrosion, chipping, ultraviolet light, acid rain and other environmental conditions which can deteriorate the coating appearance and underlying car body.

The formulations of these coatings can vary widely. However, a major challenge that faces all automotive manufacturers is how to rapidly dry and cure these coatings with minimal capital investment and floor space, which is valued at a premium in manufacturing plants.

Various ideas have been proposed to speed up drying and curing processes for automobile coatings, such as hot air convection drying. While hot air drying is rapid, a skin can form on the surface of the coating which impedes the escape of volatiles from the coating composition and causes pops, bubbles or blisters which ruin the appearance of the dried coating.

Other methods and apparatus for drying and curing a coating applied to an automobile body are disclosed in U.S. Pat. Nos. 4,771,728; 4,907,533; 4,908,231 and 4,943,447, in which the automobile body is heated with radiant heat for a time sufficient to set the coating on Class A surfaces of the body and subsequently cured with heated air.

U.S. Pat. No. 4,416,068 discloses a method and apparatus for accelerating the drying and curing of refinish coatings for automobiles using infrared radiation. Ventilation air used to protect the infrared radiators from solvent vapors is discharged as a laminar flow over the car body. FIG. 15 is a graph of temperature as a function of time showing the preferred high temperature/short drying time curve 122 versus conventional infrared drying (curve 113) and convection drying (curve 114). Such rapid, high temperature drying techniques can be undesirable because a skin can form on the surface of the coating that can cause pops, bubbles or blisters, as discussed above.

U.S. Pat. No. 4,336,279 discloses a process and apparatus for drying automobile coatings using direct radiant energy, a majority of which has a wavelength greater than 5 microns. Heated air is circulated under turbulent conditions against the back sides of the walls of the heating chamber to provide the radiant heat. Then, the heated air is circulated as a generally laminar flow along the inner sides of the walls to maintain the temperature of the walls and remove volatiles from the drying chamber. As discussed at column 7, lines 18–22, air movement is maintained at a minimum in the central portion of the inner chamber in which the automobile body is dried.

A rapid, multi-stage drying process for automobile coatings is needed which inhibits formation of surface defects and discoloration in the coating, particularly for drying primer/surfacer coatings.

SUMMARY OF THE INVENTION

The present invention provides process for drying a liquid primer coating composition applied to a surface of a metal substrate, comprising the steps of: (a) exposing the liquid primer coating composition to air having a temperature ranging from about 10° C. to about 50° C. for a period of at least about 30 seconds to volatilize at least a portion of volatile material from the liquid primer coating composition, the velocity of the air at a surface of the primer coating composition being less than about 4 meters per second; (b) applying infrared radiation and warm air simultaneously to the primer coating composition for a period of at least about 1 minute, the velocity of the air at the surface of the primer coating composition being less than about 4 meters per second, the temperature of the metal substrate being increased at a rate ranging from about 0.2° C. per second to about 2° C. per second to achieve a peak metal temperature of the substrate ranging from about 30° C. to about 120° C.; and (c) applying infrared radiation and hot air simultaneously to the primer composition for a period of at least about 2 minutes, the temperature of the metal substrate being increased at a rate ranging from about 0.1° C. per second to about 1° C. per second to achieve a peak metal temperature of the substrate ranging from about 40° C. to about 155° C., such that a dried primer coating is formed upon the surface of the metal substrate.

Another aspect of the present invention is a process for drying a powder slurry primer coating composition applied to a surface of a metal substrate, comprising the steps of: (a) applying infrared radiation and warm air simultaneously to the powder slurry primer coating composition for a period of at least about 2 minutes, the velocity of the air at the surface of the powder primer coating composition being less than about 4 meters per second, the temperature of the metal substrate being increased at a rate ranging from about 0.5° C. per second to about 1° C. per second to achieve a peak metal temperature of the substrate ranging from about 90° C. to about 110° C.; and (b) applying infrared radiation and hot air simultaneously to the powder primer composition for a period of at least about 2 minutes, the temperature of the metal substrate being increased at a rate ranging from about 0.25° C. per second to about 1° C. per second to achieve a peak metal temperature of the substrate ranging from about 125° C. to about 140° C., such that a coalesced dried primer coating is formed upon the surface of the metal substrate.

Yet another aspect of the present invention is a process for curing a powder primer coating composition applied to a surface of a metal substrate, comprising the steps of: (a) applying infrared radiation and warm air simultaneously to the powder primer coating composition for a period of at least about 2 minutes, the velocity of the air at the surface of the powder primer coating composition being less than about 4 meters per second, the temperature of the metal substrate being increased at a rate ranging from about 0.5° C. per second to about 1° C. per second to achieve a peak metal temperature of the substrate ranging from about 90° C. to about 110° C.; and (b) applying infrared radiation and hot air simultaneously to the powder primer composition for a period of at least about 2 minutes in which a temperature of the metal substrate is increased at a rate ranging from about 0.5° C. per second to about 1.5° C. per second to achieve a peak metal temperature of the substrate ranging from about 160° C. to about 200° C. and maintaining the peak metal temperature for at least about 15 minutes.

Another aspect of the present invention is a process for drying a liquid primer coating composition applied to a surface of a polymeric substrate, comprising the steps of: (a) exposing the liquid primer coating composition to air having a temperature ranging from about 10° C. to about 30° C. for a period of at least about 30 seconds to volatilize at least a portion of volatile material from the liquid primer coating composition, the velocity of the air at a surface of the primer coating composition being less than about 4 meters per second; (b) applying infrared radiation and warm air simultaneously to the primer coating composition for a period of at least about 1 minute, the velocity of the air at the surface of the primer coating composition being less than about 4 meters per second, the temperature of the polymeric substrate being increased at a rate ranging from about 0.2° C. per second to about 0.4° C. per second to achieve a peak temperature of the substrate ranging from about 30° C. to about 50° C.; and (c) applying infrared radiation and hot air simultaneously to the primer composition for a period of at least about 2 minutes, the temperature of the polymeric substrate being increased at a rate ranging from about 0.1° C. per second to about 1° C. per second to achieve a peak temperature of the substrate ranging from about 40° C. to about 145° C., such that a dried primer coating is formed upon the surface of the substrate.

Yet another aspect of the present invention is a process for curing a powder primer coating composition applied to a surface of a polymeric substrate, comprising the steps of: (a) applying infrared radiation and warm air simultaneously to the powder primer coating composition for a period of at least about 2 minutes, the velocity of the air at the surface of the powder primer coating composition being less than about 4 meters per second, the temperature of the polymeric substrate being increased at a rate ranging from about 0.5° C. per second to about 1° C. per second to achieve a peak temperature of the substrate ranging from about 90° C. to about 110° C.; and (b) applying infrared radiation and hot air simultaneously to the powder primer composition for a period of at least about 2 minutes in which a temperature of the substrate is increased at a rate ranging from about 0.5° C. per second to about 1° C. per second to achieve a peak temperature of the substrate ranging from about 160° C. to about 200° C. and maintaining the peak temperature for at least about 15 minutes.

BRIEF DESCRIPTION OF THE DRAWINGS

The foregoing summary, as well as the following detailed description of the preferred embodiments, will be better understood when read in conjunction with the appended drawings. In the drawings.

DETAILED DESCRIPTION OF THE PREFERRED EMBODIMENTS

Figure 1:
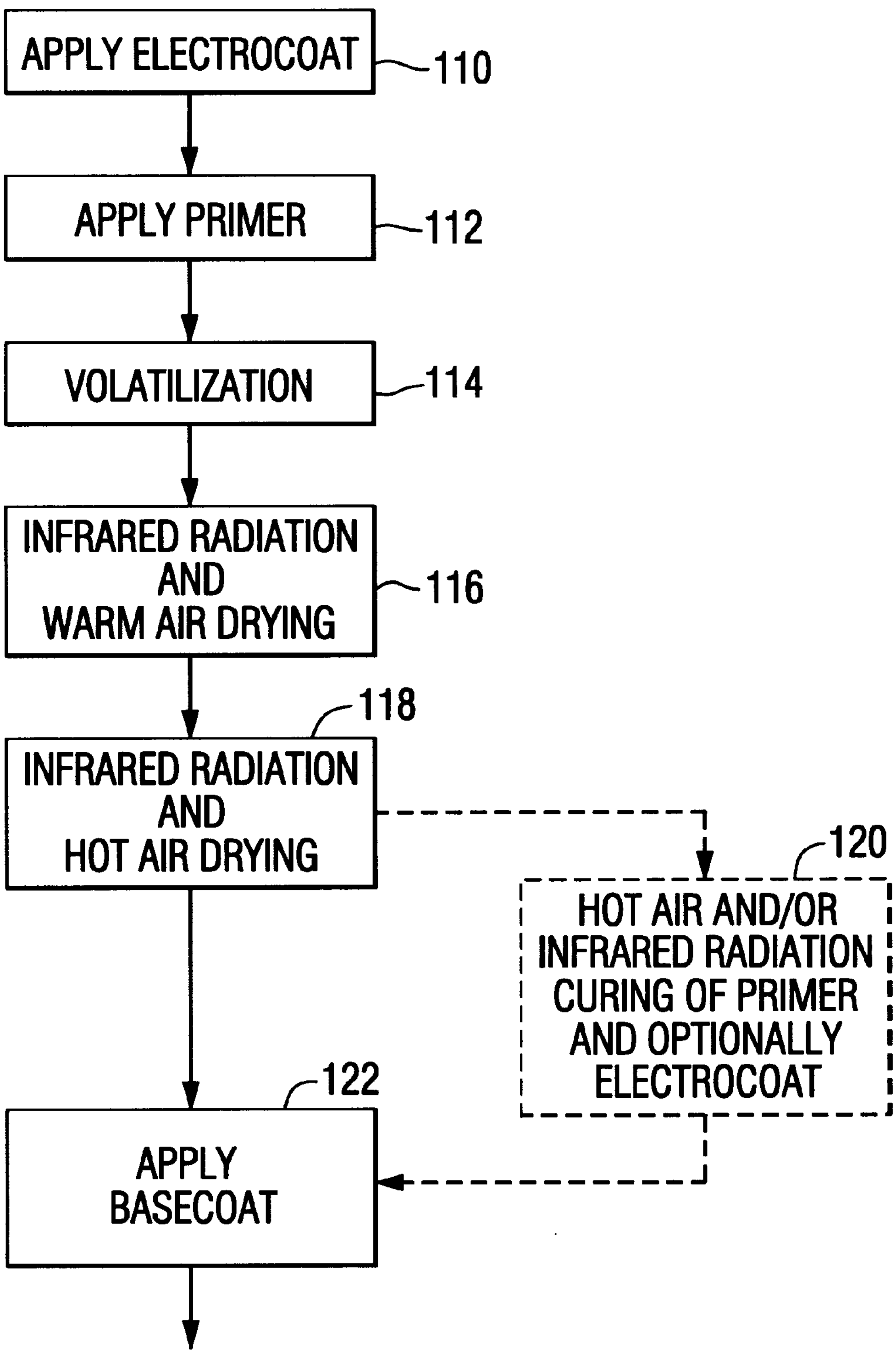
FIG. 1 is a flow diagram of a process for drying a primer coating composition according to the present invention.

Referring to the drawings, in which like numerals indicate like elements throughout, there is shown in FIG. 1 a flow diagram of a multi-stage process for drying a primer coating on a substrate according to the present invention.

This process is suitable for drying primer coatings on metal or polymeric substrates in a batch or continuous process. In a batch process, the substrate is stationary during each treatment step of the process, whereas in a continuous process the substrate is in continuous movement along an assembly line. The present invention will now be discussed generally in the context of drying primer coatings on a substrate in a continuous assembly line process, although the process also is useful for coating substrates in a batch process.

Useful substrates that can be coated according to the process of the present invention include metal substrates, polymeric substrates, such as thermoset materials and thermoplastic materials, and combinations thereof. Useful metal substrates that can be coated according to the process of the present invention include ferrous metals such as iron, steel, and alloys thereof, non-ferrous metals such as aluminum, zinc, magnesium and alloys thereof, and combinations thereof. Preferably, the substrate is formed from cold rolled steel, electrogalvanized steel such as hot dip electrogalvanized steel or electrogalvanized iron-zinc steel, aluminum or magnesium.

Useful thermoset materials include polyesters, epoxides, phenolics, polyurethanes such as reaction injected molding urethane (RIM) thermoset materials and mixtures thereof. Useful thermoplastic materials include thermoplastic polyolefins such as polyethylene and polypropylene, polyamides such as nylon, thermoplastic polyurethanes, thermoplastic polyesters, acrylic polymers, vinyl polymers, polycarbonates, acrylonitrile-butadiene-styrene (ABS) copolymers, EPDM rubber, copolymers and mixtures thereof.

Preferably, the substrates are used as components to fabricate automotive vehicles, including but not limited to automobiles, trucks and tractors. The substrates can have any shape, but are preferably in the form of automotive body components such as bodies (frames), hoods, doors, fenders, bumpers and/or trim for automotive vehicles.

The present invention first will be discussed generally in the context of drying a primer coating on a metallic automobile body. One skilled in the art would understand that the process of the present invention also is useful for drying primer coatings on non-automotive metal and/or polymeric components, which will be discussed below.

Prior to treatment according to the process of the present invention, the metal substrate can be cleaned and degreased and a pretreatment coating, such as CHEMFOS 700 zinc phosphate or BONAZINC zinc-rich pretreatment (each commercially available from PPG Industries, Inc. of Pittsburgh, Pa.), can be deposited upon the surface of the metal substrate.

Before applying the primer coating to the substrate, a liquid electrodepositable coating composition can be applied to a surface of the metal substrate (automobile body 16 shown in FIG. 2) in a first step 110 (shown in FIG. 1). The liquid electrodepositable coating composition can be applied to the surface of the substrate in step 110 by any suitable anionic or cationic electrodeposition process well known to those skilled in the art. In a cationic electrodeposition process, the liquid electrodepositable coating composition is placed in contact with an electrically conductive anode and an electrically conductive cathode with the metal surface to be coated being the cathode. Following contact with the liquid electrodepositable coating composition, an adherent film of the coating composition is deposited on the cathode when sufficient voltage is impressed between the electrodes. The conditions under which electrodeposition is carried out are, in general, similar to those used in electrodeposition of other coatings. The applied voltages can be varied and can be, for example, as low as 1 volt to as high as several thousand volts, but typically between 50 and 500 volts. The current density is usually between 0.5 and 15 amperes per square foot and tends to decrease during electrodeposition indicating the formation of an insulating film.

Useful electrodepositable coating compositions include anionic or cationic electrodepositable compositions well known to those skilled in the art. Such compositions generally comprise one or more film-forming materials and crosslinking materials. Suitable film-forming materials include epoxy-functional film-forming materials, polyurethane film-forming materials, and acrylic film-forming materials. The amount of film-forming material in the electrodepositable composition generally ranges from about 50 to about 95 weight percent on a basis of total weight solids of the electrodepositable composition.

Suitable epoxy-functional materials contain at least one, and preferably two or more, epoxy or oxirane groups in the molecule, such as di- or polyglycidyl ethers of polyhydric alcohols. Useful polyglycidyl ethers of polyhydric alcohols can be formed by reacting epihalohydrins, such as epichlorohydrin, with polyhydric alcohols, such as dihydric alcohols, in the presence of an alkali condensation and dehydrohalogenation catalyst such as sodium hydroxide or potassium hydroxide. Suitable polyhydric alcohols can be aromatic, such as bisphenol A, aliphatic, such as glycols or polyols, or cycloaliphatic. Suitable epoxy-functional materials have an epoxy equivalent weight ranging from about 100 to about 2000, as measured by titration with perchloric acid using methyl violet as an indicator. Useful polyepoxides are disclosed in U.S. Pat. No. 5,820,987 at column 4, line 52 through column 6, line 59, which is incorporated by reference herein. The epoxy-functional material can be reacted with an amine to form cationic salt groups, for example with primary or secondary amines which can be acidified after reaction with the epoxy groups to form amine salt groups or tertiary amines which can be acidified prior to reaction with the epoxy groups and which after reaction with the epoxy groups form quaternary ammonium salt groups. Other useful cationic salt group formers include sulfides.

Suitable acrylic-functional film-forming materials include polymers derived from alkyl esters of acrylic acid and methacrylic acid such as are disclosed in U.S. Pat. Nos. 3,455,806 and 3,928,157, which are incorporated herein by reference.

Examples of film-forming resins suitable for anionic electrodeposition include base-solubilized, carboxylic acid containing polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are at least partially neutralized interpolymers of hydroxy-alkyl esters of unsaturated carboxylic acids, unsaturated carboxylic acid and at least one other ethylenically unsaturated monomer. Other suitable electrodepositable resins comprise an alkyd-aminoplast vehicle, i.e., a vehicle containing an alkyd resin and an amine-aldehyde resin or mixed esters of a resinous polyol. These compositions are described in detail in U.S. Pat. No. 3,749,657 at column 9, lines 1 to 75 and column 10, lines 1 to 13, which is incorporated by reference herein. Other acid functional polymers can also be used such as phosphatized polyepoxide or phosphatized acrylic polymers which are well known to those skilled in the art.

Useful crosslinking materials for the electrodepositable coating composition comprise blocked or unblocked polyisocyanates including as aromatic diisocyanates; aliphatic diisocyanates such as 1,6-hexamethylene diisocyanate; and cycloaliphatic diisocyanates such as isophorone diisocyanate and 4,4'-methylene-bis(cyclohexyl isocyanate). Examples of suitable blocking agents for the polyisocyanates include lower aliphatic alcohols such as methanol, oximes such as methyl ethyl ketoxime and lactams such as caprolactam. The amount of the crosslinking material in the electrodepositable coating composition generally ranges from about 5 to about 50 weight percent on a basis of total resin solids weight of the electrodepositable coating composition.

Generally, the electrodepositable coating composition also comprises one or more pigments which can be incorporated in the form of a paste, surfactants, wetting agents, catalysts, film build additives, flatting agents, defoamers, microgels, pH control additives and volatile materials such as water and organic solvents, as described in U.S. Pat. No. 5,820,987 at column 9, line 13 through column 10, line 27. Useful solvents included in the composition, in addition to any provided by other coating components, include coalescing solvents such as hydrocarbons, alcohols, esters, ethers and ketones. Preferred coalescing solvents include alcohols, polyols, ethers and ketones. The amount of coalescing solvent is generally about 0.05 to about 5 weight percent on a basis of total weight of the electrodepositable coating composition.

Other useful electrodepositable coating compositions are disclosed in U.S. Pat. Nos. 4,891,111; 5,760,107; and 4,933,056, which are incorporated herein by reference. The solids content of the liquid electrodepositable coating composition generally ranges from about 3 to about 75 weight percent, and preferably about 5 to about 50 weight percent.

If the electrodepositable coating composition is applied by immersing the metal substrate into a bath, after removing the substrate from the bath the substrate is exposed to air to permit excess electrodeposited coating composition to drain from the interior cavities and surfaces of the substrate. Preferably, the drainage period is at least about 5 minutes, and more preferably about 5 to about 10 minutes so that there is no standing water from the final water rinse. The temperature of the air during the drainage period preferably ranges from about 10° C. to about 40° C. The velocity of the air during drainage is preferably less than about 0.5 meters per second.

The thickness of the electrodepositable coating applied to the substrate can vary based upon such factors as the type of substrate and intended use of the substrate, i.e., the environment in which the substrate is to be placed and the nature of the contacting materials. Generally, the thickness of the electrodepositable coating applied to the substrate ranges from about 5 to about 40 micrometers, and more preferably about 12 to about 35 micrometers.

The electrodeposited coating can be dried and cured, if desired, prior to the next step 112 of applying the primer.

The electrodeposited coating can be dried, for example, by hot air convection drying or infrared drying. Preferably, the excess electrodepositable coating/rinse is drained for about 5 to about 10 minutes. Next, infrared radiation and low velocity warm air can be applied simultaneously to the electrodeposited coating for a period of at least about 1 minute such that the temperature of the metal substrate is increased at a rate ranging from about 0.25° C. per second to about 2° C. per second to achieve a peak metal temperature ranging from about 35° C. to about 125° C. and form a pre-dried electrodeposited coating upon the surface of the metal substrate. To form a dried electrocoat, infrared radiation and hot air can be applied simultaneously to the electrodeposited coating on the metal substrate for a period of at least about 2 minutes during which the temperature of the metal substrate is increased at a rate ranging from about 0.2° C. per second to about 1.5° C. per second to achieve a peak metal temperature of the substrate ranging from about 160° C. to about 215° C. and subsequently cured by maintaining the peak metal temperature for at least about 6 minutes. Suitable apparatus for drying and curing the basecoat using a combination of infrared and convection heat are discussed in detail below for drying the primer coating.

Referring now to FIG. 1, a primer (primer/surfacer) coating composition is applied over at least a portion of the electrodeposited coating. The primer coating composition can be liquid, powder slurry or powder (solid), as desired. The liquid or powder slurry primer coating can be applied to the surface of the substrate by any suitable coating process well known to those skilled in the art, for example by dip coating, direct roll coating, reverse roll coating, curtain coating, spray coating, brush coating and combinations thereof. Powder coatings are generally applied by electrostatic deposition. The method and apparatus for applying the primer composition to the substrate is determined in part by the configuration and type of substrate material.

The liquid or powder slurry primer coating composition generally comprises one or more film-forming materials, volatile materials and, optionally, pigments. Volatile materials are not present in the powder coating composition. Preferably, the primer coating composition, whether liquid, powder slurry or powder, comprises one or more thermosetting film-forming materials, such as polyurethanes, acrylics, polyesters, epoxies and crosslinking materials.

Suitable polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate). Suitable acrylic polymers include polymers of acrylic acid, methacrylic acid and alkyl esters thereof. Other useful film-forming materials and other components for primers are disclosed in U.S. Pat. Nos. 4,971,837; 5,492,731 and 5,262,464, which are incorporated herein by reference. The amount of film-forming material in the primer generally ranges from about 37 to about 60 weight percent on a basis of total resin solids weight of the primer coating composition.

Suitable crosslinking materials include aminoplasts, polyisocyanates (discussed above) and mixtures thereof. Useful aminoplast resins are based on the addition products of formaldehyde, with an amino- or amido-group carrying substance. Condensation products obtained from the reaction of alcohols and formaldehyde with melamine, urea or benzoguanamine are most common. The amount of the crosslinking material in the primer coating composition generally ranges from about 5 to about 50 weight percent on a basis of total resin solids weight of the primer coating composition.

Volatile materials which can be included in the liquid or powder slurry primer coating composition include water and/or organic solvents, such as alcohols including methanol, propanol, ethanol, butanol, butyl alcohol and hexyl alcohol; ethers and ether alcohols, such as ethyleneglycol monoethyl ether, ethyleneglycol monobutyl ether; ketones such as methyl ethyl ketone and methyl isobutyl ketone; esters such as butyl acetate; aliphatic and alicyclic hydrocarbons such as petroleum naphthas; and aromatic hydrocarbons such as toluene and xylene. The amount of volatile material in the primer coating composition can range from about 1 to about 30 weight percent on a total weight basis of the primer coating composition.

Other additives, such as plasticizers, antioxidants, mildewcides, fungicides, surfactants, fillers and pigments, can be present in the primer coating composition in amounts generally up to about 40 weight percent. Useful fillers and pigments are disclosed in U.S. Pat. No. 4,971,837, which is incorporated herein by reference. For the liquid and powder slurry primer coating compositions, the weight percent solids of the coating generally ranges from about 30 to about 80 weight percent on a total weight basis.

Referring now to FIG. 1, if the primer coating composition applied to the surface of the substrate is in liquid form, the process of the present invention comprises a next step 12, 114 of exposing the liquid primer coating composition to low velocity air having a temperature ranging from about 10° C. to about 50° C., and preferably about 20° C. to about 35° C., for a period of at least about 30 seconds to volatilize at least a portion of the volatile material from the liquid primer coating composition and set the primer coating. This step is not necessary for treating powder or powder slurry primer coatings.

As used herein, the term "set" means that the liquid primer coating is tack-free (resists adherence of dust and other airborne contaminants) and is not disturbed or marred (waved or rippled) by air currents which blow past the primer coated surface. The velocity of the air at the exposed surface of the liquid primer coating is less than about 4 meters per second, preferably ranges from about 0.5 to about 4 meters per second and, more preferably, about 0.7 to about 1.5 meters per second.

Figure 2:
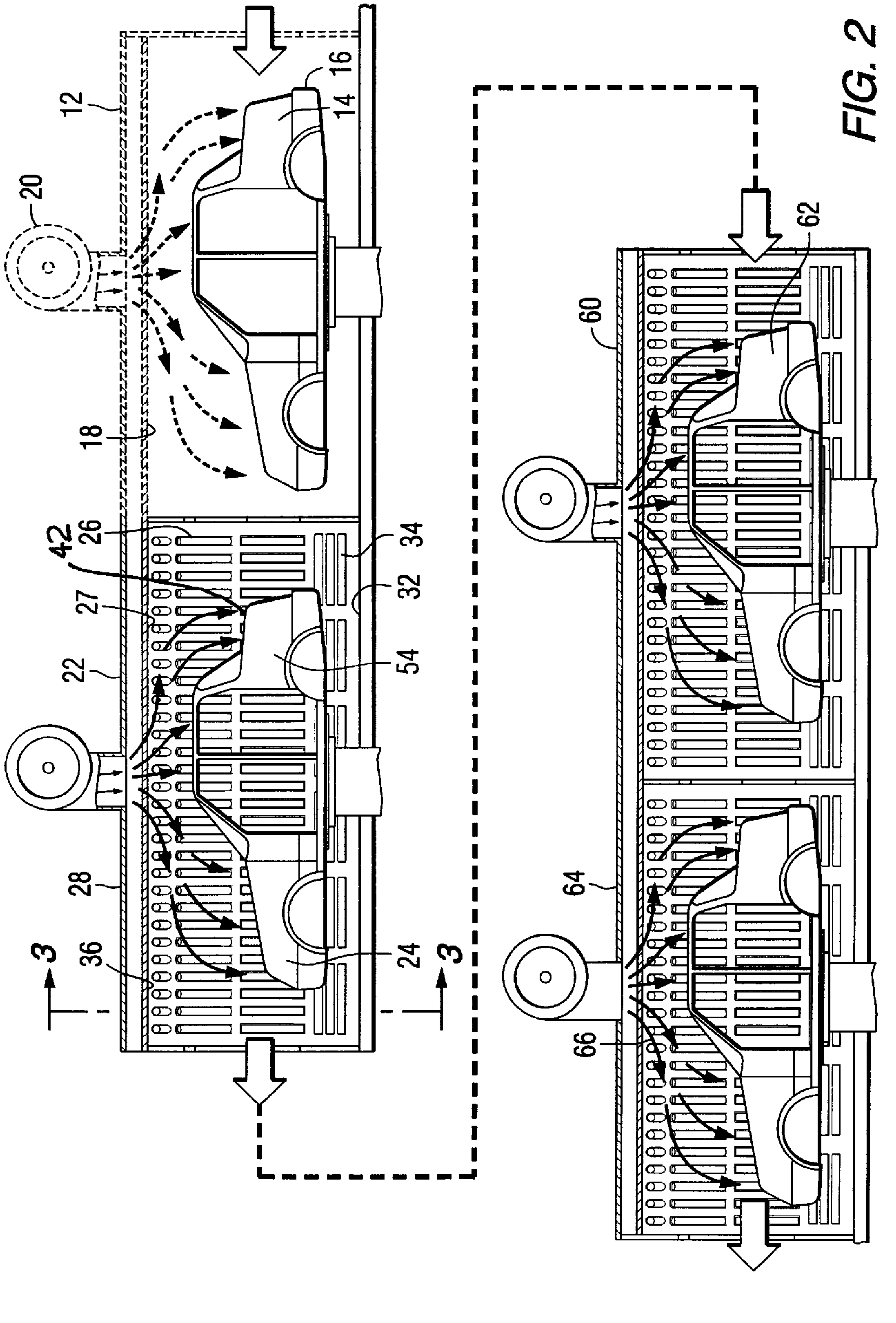
FIG. 2 is a side elevational schematic diagram of a portion of the process of FIG. 1.

The volatilization or evaporation of volatiles from the surface of the liquid primer coating 14 can be carried out in the open air, but is preferably carried out in a first drying chamber 18 in which air is circulated at low velocity to minimize airborne particle contamination as shown in FIG. 2. The automobile body 16 is positioned at the entrance to the first drying chamber 18 and slowly moved therethrough in assembly-line manner at a rate which permits the volatilization of the primer coating as discussed above. The rate at which the automobile body 16 is moved through the first drying chamber 18 and the other drying chambers discussed below depends in part upon the length and configuration of the drying chamber 18, but preferably ranges from about 3 meters per minute to about 10 meters per minute for a continuous process. One skilled in the art would understand that individual dryers can be used for each step of the process or that a single dryer having a plurality of individual drying chambers or sections (shown in FIG. 2) configured to correspond to each step of the process can be used, as desired.

The air preferably is supplied to the first drying chamber 18 by a blower 20 or dryer, shown in phantom in FIG. 2. A non-limiting example of a suitable blower is an ALTIVAR 66 blower that is commercially available from Square D Corporation. The air can be circulated at ambient temperature or heated, if necessary, to the desired temperature range of about 20° C. to about 40° C. Preferably, the primer coating is exposed to air for a period ranging from about 30 seconds to about 3 minutes before the automobile body 16 is moved to the next stage of the drying process.

Referring now to FIGS. 1 and 2, for drying a liquid primer coating, the process comprises a next step 22, 116 of applying infrared radiation and low velocity warm air simultaneously to the primer coating for a period of at least about 1 minute (preferably about 1 to about 3 minutes) such that the temperature of the metal substrate is increased at a rate ranging from about 0.2° C. per second to about 2° C. per second (preferably about 0.2° C. per second to about 1.5° C. per second) to achieve a peak metal temperature ranging from about 30° C. to about 120° C., and preferably about 35° C. to about 110° C., and form a pre-dried primer coating upon the surface of the metal substrate.

As used herein, "peak metal temperature" means the minimum target temperature to which the metal substrate (automobile body 16) must be heated. The peak metal temperature for a metal substrate is measured at the surface of the coated substrate approximately in the middle of the side of the substrate opposite the side on which the coating is applied. The peak temperature for a polymeric substrate is measured at the surface of the coated substrate approximately in the middle of the side of the substrate on which the coating is applied. It is preferred that this peak metal temperature be maintained for as short a time as possible to minimize the possibility of crosslinking of the primer coating.

Alternatively, for treating a powder slurry or powder primer coating, infrared radiation and low velocity warm air are applied to the coated metal substrate simultaneously for a period of at least about 2 minutes such that the temperature of the metal substrate is increased at a rate ranging from about 0.5° C. per second to about 1° C. per second to achieve a peak metal temperature ranging from about 90° C. to about 110° C. and form a pre-dried primer coating upon the surface of the metal substrate.

By controlling the rate at which the metal temperature is increased and peak metal temperature, flaws in the appearance of the subsequently applied basecoat and topcoat, such as pops and bubbles, can be minimized.

The infrared radiation applied preferably includes near-infrared region (0.7 to 1.5 micrometers) and intermediate-infrared region (1.5 to 20 micrometers) radiation, and more preferably ranges from about 0.7 to about 4 micrometers. The infrared radiation heats the Class A (external) surfaces 24 of the coated substrate which are exposed to the radiation and preferably does not induce chemical reaction or crosslinking of the components of the electrodeposited coating. Most non-Class A surfaces are not exposed directly to the infrared radiation but will be heated through conduction through the automobile body and random scattering of the infrared radiation.

Figure 3:
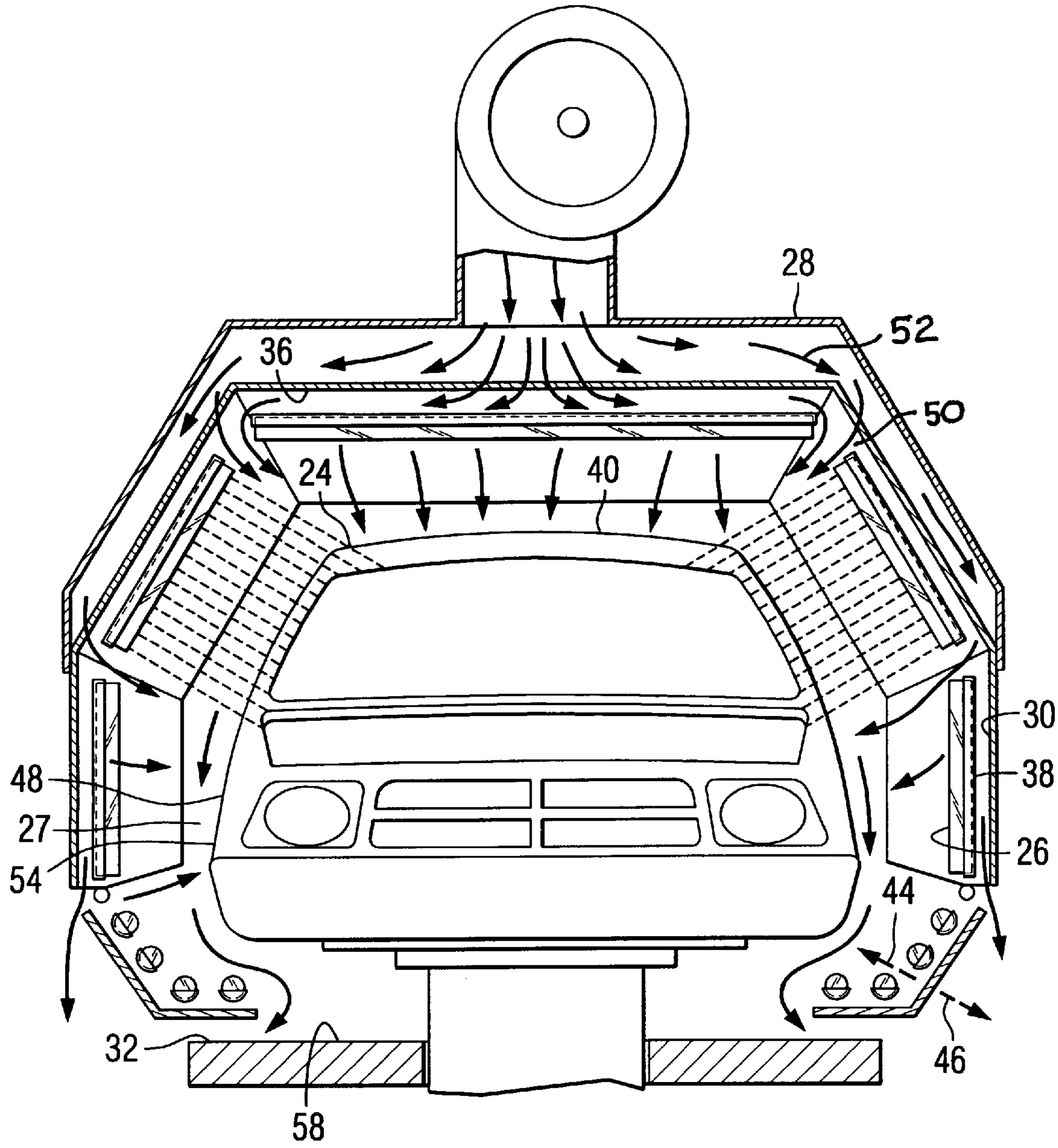
FIG. 3 is a front elevational view taken along line 3—3 of a portion of the schematic diagram of FIG. 2.

Referring now to FIGS. 2 and 3, the infrared radiation is emitted by a plurality of emitters 26 arranged in the interior drying chamber 27 of a combination infrared/convection drying apparatus 28. Each emitter 26 is preferably a high intensity infrared lamp, preferably a quartz envelope lamp having a tungsten filament. Useful short wavelength (0.76 to 2 micrometers), high intensity lamps include Model No. T-3 lamps such as are commercially available from General Electric Co., Sylvania, Phillips, Heraeus and Ushio and have an emission rate of between 75 and 100 watts per lineal inch at the light source. Medium wavelength (2 to 4 micrometers) lamps also can be used and are available from the same suppliers. The emitter lamp is preferably generally rod-shaped and has a length that can be varied to suit the configuration of the oven, but generally is preferably about 0.75 to about 1.5 meters long. Preferably, the emitter lamps on the side walls 30 of the interior drying chamber 27 are arranged generally vertically with reference to ground 32, except for a few rows 34 (preferably about 3 to about 5 rows) of emitters 26 at the bottom of the interior drying chamber 27 which are arranged generally horizontally to ground 32.

The number of emitters 26 can vary depending upon the desired intensity of energy to be emitted. In a preferred embodiment, the number of emitters 26 mounted to the ceiling 36 of the interior drying chamber 27 is about 24 to about 32 arranged in a linear side-by side array with the emitters 26 spaced about 10 to about 20 centimeters apart from center to center, and preferably about 15 centimeters. The width of the interior drying chamber 27 is sufficient to accommodate the automobile body or whatever substrate component is to be dried therein, and preferably is about 2.5 to about 3.0 meters wide. Preferably, each side wall 30 of the chamber 27 has about 50 to about 60 lamps with the lamps spaced about 15 to about 20 centimeters apart from center to center. The length of each side wall 30 is sufficient to encompass the length of the automobile body or whatever substrate component is being dried therein, and preferably is about 4 to about 6 meters. The side wall 30 preferably has four horizontal sections that are angled to conform to the shape of the sides of the automobile body. The top section of the side wall 30 preferably has 24 parallel lamps divided into 6 zones. The three zones nearest the entrance to the drying chamber 27 are operated at medium wavelengths, the three nearest the exit at short wavelengths. The middle section of the side wall is configured similarly to the top section. The two lower sections of the side walls each preferably contain 6 bulbs in a 2 by 3 array. The first section of bulbs nearest the entrance is preferably operated at medium wavelength and the other two sections at short wavelengths.

Referring to FIG. 2, each of the emitter lamps 26 is disposed within a trough-shaped reflector 38 that is preferably formed from polished aluminum. Suitable reflectors include aluminum or integral gold-sheathed reflectors that are commercially available from BGK-ITW Automotive, Heraeus and Fannon Products. The reflectors 38 gather energy transmitted from the emitter lamps 26 and focus the energy on the automobile body 16 to lessen energy scattering.

Depending upon such factors as the configuration and positioning of the automobile body 16 within the interior drying chamber 27 and the color of the basecoat to be dried, the emitter lamps 26 can be independently controlled by microprocessor (not shown) such that the emitter lamps 26 furthest from a Class A surface 24 can be illuminated at a greater intensity than lamps closest to a Class A surface 24 to provide uniform heating. For example, as the roof 40 of the automobile body 16 passes beneath a section of emitter lamps 26, the emitter lamps 26 in that zone can be adjusted to a lower intensity until the roof 40 has passed, then the intensity can be increased to heat the deck lid 42 which is at a greater distance from the emitter lamps 26 than the roof 40.

Also, in order to minimize the distance from the emitter lamps 26 to the Class A surfaces 24, the position of the side walls 30 and emitter lamps 26 can be adjusted toward or away from the automobile body as indicated by directional arrows 44, 46, respectively, in FIG. 3. One skilled in the art would understand that the closer the emitter lamps 26 are to the Class A surfaces 24 of the automobile body 16, the greater the percentage of available energy which is applied to heat the surfaces 24 and coatings present thereon. Generally, the infrared radiation is emitted at a power density ranging from about 10 to about 25 kilowatts per square meter (kW/$m^2$) of emitter wall surface, and preferably about 12 kW/$m^2$ for emitter lamps 26 facing the sides 48 of the automobile body 16 (doors or fenders) which are closer than the emitter lamps 26 facing the hood and deck lid 42 of the automobile body 16, which preferably emit about 24 kW/$m^2$.

A non-limiting example of a suitable combination infrared/convection drying apparatus is a BGK combined infrared radiation and heated air convection oven, which is commercially available from BGK Automotive Group of Minneapolis, Minn. The general configuration of this oven will be described below and is disclosed in U.S. Pat. Nos. 4,771,728; 4,907,533; 4,908,231; and 4,943,447, which are hereby incorporated by reference. Other useful combination infrared/convection drying apparatus are commercially available from Durr of Wixom, Mich., Thermal Innovations of Manasquan, N.J., Thermovation Engineering of Cleveland, Ohio, Dry-Quick of Greenburg, Ind. and Wisconsin Oven and Infrared Systems of East Troy, Wis.

Referring now to FIGS. 2 and 3, the preferred combination infrared/convection drying apparatus 28 includes baffled side walls 30 having nozzles or slot openings 50 through which air 52 is passed to enter the interior drying chamber 27 at a velocity of less than about 4 meters per second. During this step, the velocity of the air at the surface 54 of the electrodeposited coating is less than about 4 meters per second, preferably ranges from about 0.5 to about 4 meters per second and, more preferably, about 0.7 to about 1.5 meters per second.

The temperature of the air 52 generally ranges from about 25° C. to about 50° C., and preferably about 30° C. to about 40° C. The air 52 is supplied by a blower 56 or dryer and can be preheated externally or by passing the air over the heated infrared emitter lamps 26 and their reflectors 38. By passing the air 52 over the emitters 26 and reflectors 38, the working temperature of these parts can be decreased, thereby extending their useful life. Also, undesirable solvent vapors can be removed from the interior drying chamber 27. The air 52 can also be circulated up through the interior drying chamber 27 via the subfloor 58. Preferably, the air flow is recirculated to increase efficiency. A portion of the air flow can be bled off to remove contaminants and supplemented with filtered fresh air to make up for any losses.

Referring now to FIGS. 1 and 2, for drying a liquid primer coating composition, the process of the present invention comprises a next step 60, 118 of applying infrared radiation and hot air simultaneously to the primer coating on the metal substrate (automobile body 16) for a period of at least about 2 minutes, and preferably about 2 to about 3 minutes. The temperature of the metal substrate is increased at a rate ranging from about 0.1° C. per second to about 1° C. per second (preferably about 0.5 to about 0.7° C. per second) to achieve a peak metal temperature of the substrate ranging from about 40° C. to about 155° C. (preferably about 40° C. to about 125° C.). A dried primer 62 is formed thereby upon the surface of the metal substrate.

Alternatively, for treating a powder slurry primer coating, infrared radiation and hot air are applied to the coated metal substrate simultaneously for a period of at least about 2 minutes such that the temperature of the metal substrate is increased at a rate ranging from about 0.25° C. per second to about 0.5° C. per second to achieve a peak metal temperature ranging from about 125° C. to about 150° C. and form a dried primer coating upon the surface of the metal substrate.

In another alternative embodiment for treating a powder primer coating, infrared radiation and hot air are applied to the coated metal substrate simultaneously for a period of at least about 2 minutes such that the temperature of the metal substrate is increased at a rate ranging from about 0.5° C. per second to about 1.5° C. per second to achieve a peak metal temperature ranging from about 160° C. to about 200° C. to form a melted primer coating upon the surface of the metal substrate.

This step 118 can be carried out in a similar manner to that of step 116 above using a combination infrared radiation/convection drying apparatus, however the rate at which the temperature of the metal substrate is increased and peak metal temperature of the substrate vary as specified.

The infrared radiation applied preferably includes near-infrared region (0.7 to 1.5 micrometers) and intermediate-infrared region (1.5 to 20 micrometers) radiation, and more preferably ranges from about 0.7 to about 4 micrometers.

The hot drying air preferably has a temperature ranging from about 110° C. to about 150° C., and more preferably about 110° C. to about 140° C. The velocity of the air at the surface of the primer coating in step 118 is preferably less than about 6 meters per second, and preferably ranges from about 1 to about 4 meters per second.

Step 118 can be carried out using any conventional combination infrared/convection drying apparatus such as the BGK combined infrared radiation and heated air convection oven which is described in detail above. The individual emitters 26 can be configured as discussed above and controlled individually or in groups by a microprocessor (not shown) to provide the desired heating and infrared energy transmission rates.

The primer coating that is formed upon the surface of the automobile body 16 is dried and coalesced sufficiently to enable application of a basecoat such that the quality of the basecoat will not be affected adversely by further drying or coalescence of the primer. Preferably, the primer is cured prior to application of the basecoat. To cure the primer, the process of the present invention can further comprise an additional curing step 120 in which hot air 66 is applied to the primer (and any uncured electrocoat, if present) for a period of at least about 15 minutes after step 118 to achieve a peak metal temperature ranging from about 160° C. to about 200° C. and cure the primer. Preferably, a combination of hot air convection drying and infrared radiation is used simultaneously to cure the primer and electrocoat, if present. As used herein, "cure" means that any crosslinkable components of the primer and electrocoat are substantially crosslinked.

This curing step 120 can be carried out using a hot air convection oven, such as an automotive radiant wall/convection oven which is commercially available from Durr, Haden or Thermal Engineering Corp. or in a similar manner to that of step 114 above using a combination infrared radiation/convection drying apparatus, however the peak metal temperature of the substrate ranges from about 160° C. to about 200° C. and the substrate is maintained at the peak metal temperature for at least about 15 minutes, and preferably about 15 to about 20 minutes.

The hot curing air preferably has a temperature ranging from about 165° C. to about 200° C., and more preferably about 170° C. to about 190° C. The velocity of the air at the surface of the electrocoating composition in curing step 120 can range from about 4 to about 20 meters per second, and preferably ranges from about 10 to about 20 meters per second.

If a combination of hot air and infrared radiation is used, the infrared radiation applied preferably includes near-infrared region (0.7 to 1.5 micrometers) and intermediate-infrared region (1.5 to 20 micrometers), and more preferably ranges from about 0.7 to about 4 micrometers. Curing step 120 can be carried out using any conventional combination infrared/convection drying apparatus such as the BGK combined infrared radiation and heated air convection oven which is described in detail above. The individual emitters 26 can be configured as discussed above and controlled individually or in groups by a microprocessor (not shown) to provide the desired heating and infrared energy transmission rates.

The process of the present invention can further comprise a cooling step in which the temperature of the automobile body 16 having the dried and/or cured primer thereon from steps 116, 118 and/or 120 is cooled, preferably to a temperature ranging from about 20° C. to about 60° C. and, more preferably, about 25° C. to about 30° C. Cooling the primer coated automobile body 16 can facilitate application of the next coating of liquid basecoat thereon by preventing a rapid flash of the liquid basecoat volatiles which can cause poor flow, rough surfaces and generally poor appearance. The primer coated automobile body 16 can be cooled in air at a temperature ranging from about 15° C. to about 35° C., and preferably about 25° C. to about 30° C. for a period ranging from about 15 to about 45 minutes. Alternatively or additionally, the primer coated automobile body 16 can be cooled by exposure to chilled, saturated air blown onto the surface of the substrate at about 4 to about 10 meters per second to prevent cracking of the coating.

The process of the present invention can further comprise an additional step 122 of applying a liquid basecoating composition upon the surface of the dried and/or cured primer. The liquid basecoating can be applied to the surface of the substrate by any suitable coating process well known to those skilled in the art, for example by dip coating, direct roll coating, reverse roll coating, curtain coating, spray coating, brush coating and combinations thereof.

The liquid basecoating composition comprises a film-forming material or binder, volatile material and optionally pigment. Preferably, the basecoating composition is a crosslinkable coating composition comprising at least one thermosettable film-forming material, such as acrylics, polyesters (including alkyds), polyurethanes and epoxies, and at least one crosslinking material such as are discussed above. Thermoplastic film-forming materials such as polyolefins also can be used. The amount of film-forming material in the liquid basecoat generally ranges from about 40 to about 97 weight percent on a basis of total solids of the basecoating composition. The amount of crosslinking material in the basecoat coating composition generally ranges from about 5 to about 50 weight percent on a basis of total resin solids weight of the basecoat coating composition.

Suitable acrylic film-forming polymers include copolymers of one or more of acrylic acid, methacrylic acid and alkyl esters thereof, such as methyl methacrylate, ethyl methacrylate, hydroxyethyl methacrylate, butyl methacrylate, ethyl acrylate, hydroxyethyl acrylate, butyl acrylate and 2-ethylhexyl acrylate, optionally together with one or more other polymerizable ethylenically unsaturated monomers including vinyl aromatic compounds such as styrene and vinyl toluene, nitriles such as acrylontrile and methacrylonitrile, vinyl and vinylidene halides, and vinyl esters such as vinyl acetate. Other suitable acrylics and methods for preparing the same are disclosed in U.S. Pat. No. 5,196,485 at column 11, lines 16–60, which are incorporated herein by reference.

Polyesters and alkyds are other examples of resinous binders useful for preparing the basecoating composition. Such polymers can be prepared in a known manner by condensation of polyhydric alcohols, such as ethylene glycol, propylene glycol, butylene glycol, 1,6-hexylene glycol, neopentyl glycol, trimethylolpropane and pentaerythritol, with polycarboxylic acids such as adipic acid, maleic acid, fumaric acid, phthalic acids, trimellitic acid or drying oil fatty acids.

Polyurethanes also can be used as the resinous binder of the basecoat. Useful polyurethanes include the reaction products of polymeric polyols such as polyester polyols or acrylic polyols with a polyisocyanate, including aromatic diisocyanates such as 4,4'-diphenylmethane diisocyanate, aliphatic diisocyanates such as 1,6-hexamethylene diisocyanate, and cycloaliphatic diisocyanates such as isophorone diisocyanate and 4,4'-methylene-bis(cyclohexyl isocyanate).

The liquid basecoating composition comprises one or more volatile materials such as water, organic solvents and/or amines. Nonlimiting examples of useful solvents included in the composition, in addition to any provided by other coating components, include aliphatic solvents such as hexane, naphtha, and mineral spirits; aromatic and/or alkylated aromatic solvents such as toluene, xylene, and SOLVESSO 100; alcohols such as ethyl, methyl, n-propyl, isopropyl, n-butyl, isobutyl and amyl alcohol, and mpyrol; esters such as ethyl acetate, n-butyl acetate, isobutyl acetate and isobutyl isobutyrate; ketones such as acetone, methyl ethyl ketone, methyl isobutyl ketone, diisobutyl ketone, methyl n-amyl ketone, and isophorone, glycol ethers and glycol ether esters such as ethylene glycol monobutyl ether, diethylene glycol monobutyl ether, ethylene glycol monohexyl ether, propylene glycol monomethyl ether, propylene glycol monopropyl ether, ethylene glycol monobutyl ether acetate, propylene glycol monomethyl ether acetate, and dipropylene glycol monomethyl ether acetate. Useful amines include alkanolamines. The solids content of the liquid basecoating composition generally ranges from about 15 to about 60 weight percent, and preferably about 20 to about 50 weight percent.

The basecoating composition can further comprise one or more additives such as pigments, fillers, UV absorbers, rheology control agents or surfactants. Useful pigments and fillers include aluminum flake, bronze flakes, coated mica, nickel flakes, tin flakes, silver flakes, copper flakes, mica, iron oxides, lead oxides, carbon black, titanium dioxide and talc. The specific pigment to binder ratio can vary widely so long as it provides the requisite hiding at the desired film thickness and application solids.

Suitable waterborne basecoats for color-plus-clear composites include those disclosed in U.S. Pat. Nos. 4,403,003; 5,401,790 and 5,071,904, which are incorporated by reference herein. Also, waterborne polyurethanes such as those prepared in accordance with U.S. Pat. No. 4,147,679 can be used as the resinous film former in the basecoat, which is incorporated by reference herein. Suitable film formers for organic solvent-based base coats are disclosed in U.S. Pat. No. 4,220,679 at column 2, line 24 through column 4, line 40 and U.S. Pat. No. 5,196,485 at column 11, line 7 through column 13, line 22, which are incorporated by reference herein.

The thickness of the basecoating composition applied to the substrate can vary based upon such factors as the type of substrate and intended use of the substrate, i.e., the environment in which the substrate is to be placed and the nature of the contacting materials. Generally, the thickness of the basecoating composition applied to the substrate ranges from about 10 to about 38 micrometers, and more preferably about 12 to about 30 micrometers.

The basecoat can be dried by conventional hot air convection drying or infrared drying, but preferably is dried by exposing the basecoat to low velocity air to volatilize at least a portion of the volatile material from the liquid basecoating composition and set the basecoating composition. The basecoating composition can be exposed to air having a temperature ranging from about 10° C. to about 50° C. for a period of at least about 5 minutes to volatilize at least a portion of volatile material from the liquid basecoating composition, the velocity of the air at a surface of the basecoating composition being less than about 0.5 meters per second, using apparatus similar to step 114 above. Infrared radiation and hot air can be applied simultaneously to the basecoating composition for a period of at least about 2 minutes, to increase the temperature of the metal substrate at a rate ranging from about 0.4° C. per second to about 1.1° C. per second to achieve a peak metal temperature of the substrate ranging from about 120° C. to about 165° C., such that a dried basecoat is formed upon the surface of the metal substrate, similar to step 116 above. The velocity of the air at the surface of the basecoating composition is preferably less than about 4 meters per second during this drying step.

The dried basecoat that is formed upon the surface of the automobile body 16 is dried sufficiently to enable application of a topcoat such that the quality of the topcoat will not be affected adversely by further drying of the basecoat. For waterborne basecoats, "dry" means the almost complete absence of water from the basecoat. If too much water is present, the topcoat can crack, bubble or "pop" during drying of the topcoat as water vapor from the basecoat attempts to pass through the topcoat.

The dried basecoat can be cured prior to application of the topcoat if a powder topcoat is to be applied thereon. To cure the dried basecoat, the process of the present invention can further comprise an additional curing step in which hot air is applied to the dried basecoat for a period of at least about 6 minutes to achieve a peak metal temperature ranging from about 110° C. to about 135° C. Preferably, a combination of hot air convection drying and infrared radiation is used simultaneously to cure the dried basecoat. As used herein, "cure" means that any crosslinkable components of the dried basecoat are substantially crosslinked.

This curing step can be carried out using a hot air convection dryer, such as are discussed above or in a similar manner to that of step 120 above using a combination infrared radiation/convection drying apparatus, however the peak metal temperature of the substrate ranges from about 110° C. to about 135° C. and the substrate is maintained at the peak metal temperature for at least about 6 minutes, and preferably about 6 to about 20 minutes.

The hot curing air preferably has a temperature ranging from about 110° C. to about 140° C., and more preferably about 120° C. to about 135° C. The velocity of the air at the surface of the basecoating composition in the curing step can range from about 4 to about 20 meters per second, and preferably ranges from about 10 to about 20 meters per second.

If a combination of hot air and infrared radiation is used, the infrared radiation applied preferably includes near-infrared region (0.7 to 1.5 micrometers) and intermediate-infrared region (1.5 to 20 micrometers), and more preferably ranges from about 0.7 to about 4 micrometers.

The process of the present invention can further comprise a cooling step in which the temperature of the automobile body 16 having the dried and/or cured basecoat thereon is cooled, preferably to a temperature ranging from about 20° C. to about 60° C. and, more preferably, about 25° C. to about 30° C. Cooling the basecoated automobile body 16 can facilitate application of the topcoat by improving flow and reducing hot air eddy currents to increase transfer efficiency. The basecoated automobile body 16 can be cooled in air at a temperature ranging from about 15° C. to about 35° C., and preferably about 25° C. to about 30° C. for a period ranging from about 3 to about 6 minutes. Alternatively or additionally, the basecoated automobile body 16 can be cooled as discussed above for cooling the primer.

After the basecoating on the automobile body 16 has been dried (and cured and/or cooled, if desired), a topcoating composition is applied over the basecoat. The topcoat can be liquid, powder or powder slurry, as desired. Preferably, the topcoating composition is a crosslinkable coating comprising at least one thermosettable film-forming material and at least one crosslinking material, although thermoplastic film-forming materials such as polyolefins can be used. The topcoating composition can include crosslinking materials and additional ingredients such as are discussed above but preferably not pigments.

Suitable waterborne topcoats are disclosed in U.S. Pat. No. 5,098,947 (incorporated by reference herein) and are based on water soluble acrylic resins. Useful solvent borne topcoats are disclosed in U.S. Pat. Nos. 5,196,485 and 5,814,410 (incorporated by reference herein) and include polyepoxides and polyacid curing agents. Suitable powder topcoats are described in U.S. Pat. No. 5,663,240 (incorporated by reference herein) and include epoxy functional acrylic copolymers and polycarboxylic acid crosslinking agents. The amount of the topcoating composition applied to the substrate can vary based upon such factors as the type of substrate and intended use of the substrate, i.e., the environment in which the substrate is to be placed and the nature of the contacting materials, but generally ranges from about 25 to about 75 micrometers.

The topcoat, if in liquid form, can be dried by any conventional drying means such as hot air convection or infrared drying, such that any crosslinkable components of the liquid topcoating are crosslinked to such a degree that the automobile industry accepts the coating process as sufficiently complete to transport the coated automobile body without damage to the topcoat. Preferably, the liquid topcoating is dried in a manner similar to the basecoating using a combination infrared/hot air convection dryer as described above.

After drying, the liquid topcoat is cured. Drying is not necessary for a powder topcoat, but the powder topcoat must be cured. The topcoating can be cured using any conventional hot air convection dryer or combination convection/infrared dryer such as are discussed above. Generally, the topcoating is heated to a temperature of about 120° C. to about 150° C. for a period of about 20 to about 40 minutes to cure the liquid topcoat. The thickness of the dried and crosslinked multi-component composite coating is generally about 0.2 to 5 mils (5 to 125 micrometers), and preferably about 0.4 to 3 mils (10 to 75 micrometers).

Alternatively, if the basecoat was not cured prior to applying a liquid topcoat, both the basecoat and liquid topcoating composition can be cured together by applying hot air convection and/or infrared heating using apparatus such as are described in detail above to cure both the basecoat and the liquid coating composition. To cure the basecoat and the liquid coating composition, the substrate is generally heated to a temperature of about 120° C. to about 150° C. for a period of about 20 to about 40 minutes to cure the liquid topcoat.

Other aspects of the present invention include processes for coating a polymeric substrate with a liquid, powder slurry or powder primer coating composition. The process includes steps similar to those used for coating a metal substrate above, except that an electrocoat is not present. The primer coating composition is applied to a surface of the polymeric substrate as described above. If a liquid primer coating is used, the liquid primer composition is exposed to air having a temperature ranging from about 10° C. to about 30° C. for a period of at least about 30 seconds (preferably about 30 seconds to about 3 minutes) to volatilize at least a portion of volatile material from the liquid primer coating composition. The velocity of the air at a surface of the liquid primer composition is less than about 4 meters per second, and preferably ranges from about 0.3 to about 0.5 meters per second. The apparatus used to volatilize the liquid primer can be the same as that used to volatilize the liquid primer for the metal substrate discussed above.

Next, infrared radiation and warm air are applied simultaneously to the devolatilized liquid primer composition for a period of at least about 1 minute and preferably about 1 to about 3 minutes. The velocity of the air at the surface of the devolatilized liquid primer composition is less than about 4 meters per second, and preferably ranges from about 0.75 to about 1.5 meters per second. The temperature of the polymeric substrate is increased at a rate ranging from about 0.2° C. per second to about 0.4° C. per second to achieve a peak polymeric substrate temperature ranging from about 30° C. to about 50° C., such that a dried primer is formed upon the surface of the polymeric substrate.

For a powder slurry or powder primer, infrared radiation and warm air are applied simultaneously to the primer composition for a period of at least about 2 minutes and preferably about 2 to about 3 minutes. The velocity of the air at the surface of the primer composition is less than about 4 meters per second, and preferably ranges from about 0.75 to about 1.5 meters per second. The temperature of the polymeric substrate is increased at a rate ranging from about 0.5° C. per second to about 1° C. per second to achieve a peak polymeric substrate temperature ranging from about 90° C. to about 110° C.

For the dried liquid primer coating composition, infrared radiation and hot air are applied simultaneously to the primer composition for a period of at least about 2 minutes and preferably about 2 to about 3 minutes. The velocity of the air at the surface of the primer composition is less than about 6 meters per second, and preferably ranges from about 1 to about 4 meters per second. The temperature of the polymeric substrate is increased at a rate ranging from about 0.1° C. per second to about 1° C. per second to achieve a peak polymeric substrate temperature ranging from about 40° C. to about 125° C., such that a dried primer is formed upon the surface of the polymeric substrate. The apparatus used to dry the primer can be the same combined infrared/hot air convection apparatus such as is discussed above for treating the metal substrate.

For the powder slurry or powder primer, infrared radiation and hot air are applied simultaneously to the primer composition for a period of at least about 2 minutes and preferably about 2 to about 3 minutes. The velocity of the air at the surface of the primer composition is less than about 6 meters per second, and preferably ranges from about 1 to about 4 meters per second. The temperature of the polymeric substrate is increased at a rate ranging from about 0.5° C. per second to about 1° C. per second to achieve a peak polymeric substrate temperature ranging from about 160° C. to about 200° C.

The primer can be cured to coalesce and/or crosslink any crosslinkable components of the primer, if desired, before the topcoating is applied. To cure the primer, the peak polymeric substrate temperature can be maintained for a period of at least about 6 minutes, and preferably about 6 to about 15 minutes, using convection drying, infrared drying or a combination thereof.

The primer coated polymeric substrate is preferably cooled to a temperature of about 25° C. to about 30° C. before the basecoating and topcoating compositions are applied over the primer. Suitable basecoating and topcoating compositions and methods of applying the same are discussed in detail above for coating the metal substrate.

The present invention will be described further by reference to the following example. The following example is merely illustrative of the invention and is not intended to be limiting. Unless otherwise indicated, all parts are by weight.

EXAMPLE

A GTX polyphenylene oxide/nylon blend (available from General Electric Plastics) composite automobile fender was coated with about 0.2 millimeters (0.8 mils) of No. 045 solventborne black conductive primer coating composition which is commercially available from BASF Corp. of Parsippany, N.J. The primed fender was heated using a BGK combination infrared/air convection oven from ambient temperature (about 25° C.) to 43° C. (localized peak plastic temperature) over a three-minute period using heated air at a temperature of about 38° C. and infrared radiation at a watt density of about 3 $kW/m^2$ and wavelength of about 0.74.0 micrometers. Next, the coated fender was heated over a three-minute period to 156° C. peak polymeric substrate temperature to dry the primer coating using heated air at a temperature of about 38° C. and infrared radiation at a watt density of about 15 $kW/m^2$ and wavelength of about 0.7–4.0 micrometers.

Advantages of the processes of the present invention include rapid coating of metal or polymeric substrates and reduced processing time by eliminating or reducing the need for long assembly line ovens. Also, the automobile can be primed with the plastic body panels and trim attached to the steel body.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

Therefore, I claim:

1. A process for drying a liquid primer coating composition applied to a surface of a metal substrate, comprising the steps of:

(a) applying air having a first air temperature ranging from about 10° C. to about 50° C. to the liquid primer coating composition for a first period of at least about 30 seconds to volatilize at least a portion of volatile material from the liquid primer coating composition, a first velocity of the air at a surface of the primer coating composition ranging from about 0.5 to about 4 meters per second;

(b) applying infrared radiation and warm air having a second air temperature ranging from about 25° C. to about 50° C. simultaneously to the primer coating composition for a second period of at least about 1 minute, a second velocity of the air at the surface of the primer coating composition being less than about 4 meters per second, a first temperature of the metal substrate being increased at a first rate ranging from about 0.20° C. per second to about 2° C. per second to achieve a first peak metal temperature of the substrate ranging from about 30° C. to about 120° C.; and (c) applying the infrared radiation and hot air having a third air temperature ranging from about 110° C. to about 150° C. simultaneously to the primer composition for a third period of at least about 2 minutes, a second temperature of the metal substrate being increased at a second rate ranging from about 0.1° C. per second to about 1° C. per second to achieve a second peak metal temperature of the substrate ranging from about 40° C. to about 155° C., such that a dried primer coating is formed upon the surface of the metal substrate.

2. The process according to claim 1, wherein the metal substrate is selected from the group consisting of iron, steel, aluminum, zinc, magnesium and alloys and combinations thereof.

3. The process according to claim 1, wherein the metal substrate is an automotive body component.

4. The process according to claim 1, wherein the volatile material of the liquid primer composition comprises water.

5. The process according to claim 1, wherein the volatile material of the liquid primer composition comprises an organic solvent.

6. The process according to claim 1, wherein the air has a temperature ranging from about 20° C. to about 35° C. in the step (a).

7. The process according to claim 1, wherein the period ranges from about 30 seconds to about 3 minutes in the step (a).

8. The process according to claim 1, wherein the infrared radiation of the steps (b) and (c) is emitted at a wavelength ranging from about 0.7 to about 20 micrometers.

9. The process according to claim 8 wherein the wavelength ranges from about 0.7 to about 4 micrometers.

10. The process according to claim 1, wherein the infrared radiation is emitted at a power density ranging from about 10 to about 40 kilowatts per square meter of emitter wall surface.

11. The process according to claim 1, wherein the period ranges from about 1 to about 3 minutes in the step (b).

12. The process according to claim 1, wherein the air velocity ranges from about 0.5 to about 4 meters per second in the step (b).

13. The process according to claim 1, wherein the temperature of the metal substrate is increased at a rate ranging from about 0.2° C. per second to about 1.5° C. per second in the step (b).

14. The process according to claim 1, wherein the peak metal temperature of the metal substrate ranges from about 35° C. to about 110° C. in the step (b).

15. The process according to claim 1, wherein the period ranges from about 2 to about 3 minutes in the step (c).

16. The process according to claim 1, wherein the temperature of the metal substrate is increased at a rate ranging from about 0.5° C. per second to about 0.7° C. per second in the step (c).

17. The process according to claim 1, wherein the peak metal temperature of the metal substrate ranges from about 40° C. to about 125° C. in the step (c).

18. The process according to claim 1 further comprising an additional step (d) of applying hot air having a temperature ranging from about 165° C. to about 200° C. to the dried primer coating for a fouth period of at least about 6 minutes after the step (c) to achieve a third peak metal temperature ranging from about 160° C. to about 200° C., such that a cured primer coating is formed upon the surface of the metal substrate.

19. The process according to claim 18, wherein additional the step (d) further comprises applying infrared radiation to the dried primer coating simultaneously while applying the hot air.

20. The process according to claim 1 further comprising an additional step (e) of applying a basecoating composition over the dried primer coating.

21. A process for drying a powder slurry primer coating composition applied to a surface of a metal substrate having an electrodeposited coating thereon, comprising the steps of:

(a) applying infrared radiation and warm air having a first air temperature ranging from about 25° C. to about 50° C. simultaneously to the powder slurry primer coating composition for a first period of at least about 2 minutes, a first velocity of the air at the surface of the powder primer coating composition being less than about 4 meters per second, a first temperature of the metal substrate being increased at a first rate ranging from about 0.5° C. per second to about 1° C. per second to achieve a first peak metal temperature of the substrate ranging from about 90° C. to about 110° C.; and (b) applying the infrared radiation and hot air having a second air temperature ranging from about 110° C. to about 150° C. simultaneously to the powder primer composition for a second period of at least about 2 minutes, a second temperature of the metal substrate being increased at a second rate ranging from about 0.25° C. per second to about 1° C. per second to achieve a second peak metal temperature of the substrate ranging from about 125° C. to about 140° C., such that a coalesced dried primer coating is formed upon the surface of the metal substrate having the electrodeposited coating thereon.

22. A process for curing a powder primer coating composition applied to a surface of a metal substrate having an electrodeposited coating thereon, comprising the steps of:

(a) applying infrared radiation and warm air having a first air temperature ranging from about 25° C. to about 50° C. simultaneously to the powder primer coating composition for a first period of at least about 2 minutes, a first velocity of the air at the surface of the powder primer coating composition being less than about 4 meters per second, a first temperature of the metal substrate being increased at a first rate ranging from about 0.5° C. per second to about 1° C. per second to achieve a first peak metal temperature of the substrate ranging from about 90° C. to about 110° C.; and (b) applying the infrared radiation and hot air having a second air temperature ranging from about 110° C. to about 150° C. simultaneously to the powder primer composition for a second period of at least about 2 minutes in which a second temperature of the metal substrate is increased at a second rate ranging from about 0.5° C. per second to achieve a second peak metal temperature of the substrate ranging from about 160° C. to about 200° C. and maintaining the second peak metal temperature for at least about 15 minutes such that a cured powder primer coating is formed upon the metal substrate having the electrodeposited coating thereon.

23. A process for drying a liquid primer coating composition applied to a surface of a polymeric substrate, comprising the steps of:

(a) applying air having a first air temperature ranging from about 10° C. to about 30° C. to the liquid primer coating composition for a first period of at least about 30 seconds to volatilize at least a portion of volatile material from the liquid primer coating composition, a first velocity of the air at a surface of the primer coating composition ranging from about 0.5 to about 4 meters per second;

(b) applying infrared radiation and warm air having a second air temperature ranging from about 25° C. to about 50° C. simultaneously to the primer coating composition for a second period of at least about 1 minute, a second velocity of the air at the surface of the primer coating composition being less than about 4 meters per second, temperature of the polymeric substrate being increased at a first rate ranging from about 0.20° C. per second to about 0.4° C. per second to achieve a first peak temperature of the substrate ranging from about 30° C. to about 50° C.; and (c) applying the infrared radiation and hot air having a third air temperature ranging from about 110° C. to about 150° C. simultaneously to the primer composition for a third period of at least about 2 minutes, a second temperature of the polymeric substrate being increased at a second rate ranging from about 0.1° C. per second to about 1° C. per second to achieve a second peak temperature of the substrate ranging from about 40° C. to about 145° C., such that a dried primer coating is formed upon the surface of the substrate.

24. A process for curing a powder primer coating composition applied to a surface of a polymeric substrate, comprising the steps of:

(a) applying infrared radiation at a power density of about 25 kilowatts per square meter or less and warm air having a first air temperature ranging from about 25° C. to about 50° C. simultaneously to the powder primer coating composition for a first period of at least about 2 minutes, a first velocity of the air at the surface of the powder primer coating composition being less than about 4 meters per second, a first temperature of the polymeric substrate being increased at a first rate ranging form about 0.5° C. per second to about 1° C. per second to achieve a first peak temperature of the substrate ranging from about 90° C. per to about 110° C.; and (b) applying the infrared radiation at a power density of about 25 kilowatts per square meter or less and hot air having a second air temperature ranging from about 110° C. to about 150° C. simultaneously to the powder primer composition for a second period of at least about 2 minutes in which a second temperature of the substrate is increased at a second rate ranging from about 0.5° C. per second to about 1° C. per second to achieve a second peak temperature of the substrate ranging from about 160° C. to about 200° C. and maintaining the second peak temperature for at least about 15 minutes.

* * * * *

UNITED STATES PATENT AND TRADEMARK OFFICE

CERTIFICATE OF CORRECTION

PATENT NO. : 6,200,650 B1
DATED : March 13, 2001
INVENTOR(S) : Emch

It is certified that error appears in the above-identified patent and that said Letters Patent is hereby corrected as shown below:

Title page,
Item [57], ABSTRACT,
Line 19, delete "10ºC" and insert -- 1ºC --.

Column 20,
Line 13, delete the word "fouth" and insert -- fourth --.

Column 21,
Line 28, insert -- a first -- before "temperature".

Signed and Sealed this

Twenty-seventh Day of August, 2002

*Attest:*

JAMES E. ROGAN

*Attesting Officer*

*Director of the United States Patent and Trademark Office*